United States Patent [19]
McLaughlin et al.

[11] 3,796,449
[45] Mar. 12, 1974

[54] REINFORCED FLANGE FOR PLASTIC PIPE

[75] Inventors: Hugh T. McLaughlin, Santa Ana; Harlan H. Kline, Diamond Bar, both of Calif.

[73] Assignee: Ameron, Inc., Monterey Park, Calif.

[22] Filed: Apr. 28, 1972

[21] Appl. No.: 248,737

[52] U.S. Cl.............. 285/405, 138/174, 285/423, 285/DIG. 16
[51] Int. Cl............................................. F16l 9/12
[58] Field of Search .... 285/405, 423, 115, DIG. 16, 285/363, 364, 365, 366, 367, 368, 114, 416, 412, 406, 407, 408, 409-411, 413-415; 287/DIG. 2; 308/238; 138/109, 121, 153, 172, 173, 174; 264/249; 156/293

[56] References Cited
UNITED STATES PATENTS

| | | | |
|---|---|---|---|
| 2,879,804 | 3/1959 | Hammond | 285/229 |
| 3,224,795 | 12/1965 | Conley | 138/109 |
| 3,072,449 | 1/1963 | Morley | 308/238 |
| 3,601,459 | 8/1971 | Cutting | 308/238 |
| 3,430,661 | 3/1969 | Sabine | 138/109 |
| 1,684,396 | 9/1928 | Hinnekens | 285/363 |
| 3,596,681 | 8/1971 | Elson | 138/109 |
| 2,622,949 | 12/1952 | Cotchett | 287/DIG. 2 |

FOREIGN PATENTS OR APPLICATIONS

| | | | |
|---|---|---|---|
| 843,439 | 8/1960 | Great Britain | 285/368 |
| 701,508 | 12/1953 | Great Britain | 308/238 |

*Primary Examiner*—Jordan Franklin
*Assistant Examiner*—Conrad L. Berman
*Attorney, Agent, or Firm*—Christie, Parker & Hale

[57] ABSTRACT

An improved flange for plastic pipe includes a reinforcing ring preferably embedded in a hub of the flange. The reinforcing ring is made of a material having greater strength than that of pipe or flange. The reinforced plastic flange improves resistance to hoop expansion of the plastic pipe, and increases the rupture strength of the flange.

12 Claims, 2 Drawing Figures

PATENTED MAR 12 1974　　3,796,449

REINFORCED FLANGE FOR PLASTIC PIPE

BACKGROUND OF THE INVENTION

This invention relates generally to improvements in the internal pressure capability of flanged joints of plastic piping systems.

Flanges are placed at the ends of pipe sections to provide means for joining the ends of the adjacent pipe sections in a pipeline. In recent years, there has been a substantial increase in the use of plastic pipe in piping systems for transmitting fluids under high pressures. Fiber-reinforced plastic (FRP) pipe, particularly that made of thermosetting plastic reinforced with glass fibers, is widely used in industrial applications because of its resistance to corrosive liquids and its high strength.

In the past, molded fiberglass and asbestos reinforced plastic flanges have been a weak link in FRP piping systems. For example, flanges in a FRP piping system typically fail at much lower internal pressures than other parts of the system when the system is pressurized to failure.

The typical plastic flange for a FRP piping system is either threaded or bonded onto the exterior of the FRP pipe body. FRP piping systems are generally designed to dimensions which are compatible with standardized steel piping systems. It is common practice to provide plastic flanges with elongated hubs to provide sufficient strength in the threaded or bonded joint between the flange and the pipe body, while still maintaining the dimensions of the flange within accepted standards.

When the inside of a plastic pipe is pressurized, it increases in diameter. Generally speaking, when a flange is placed around a plastic pipe, it resists some expansion of the pipe, but the flange itself still expands somewhat. At the point where the pipe enters the hub of the flange, the hub is subjected to stress caused by both the hydrostatic load directly inside the flange and loads transmitted to the hub of the flange by bending of the pipe wall. A hub having an inside diameter (I.D.) of at least about 6 inches tends to split when the pipe to which it is secured is subjected to relatively high internal pressure.

SUMMARY OF THE INVENTION

Briefly, this invention provides an improved flange for plastic pipe which extends the internal pressure capability of flanged joints. The flange includes an embedded reinforcing ring having a strength greater than that of the flange or the pipe body. In the preferred form of the invention, the reinforcing ring is embedded in the hub of the flange.

Preferably, the reinforcing ring is made of steel rod, and occupies from about 10 percent to about 60 percent of the volume of the hub of the flange.

The reinforcing ring improves resistance to hoop expansion of the plastic pipe, and substantially prevents the flange from splitting when the pipe is subjected to common internal pressures. Tests have shown that the reinforcing ring substantially increases the rupture strength of the flange.

BRIEF DESCRIPTION OF THE DRAWING

These and other aspects of the invention will be more fully understood by referring to the following detailed description and the accompanying drawing in which.

DETAILED DESCRIPTION OF THE PREFERRED EMBODIMENT

Figure 1:
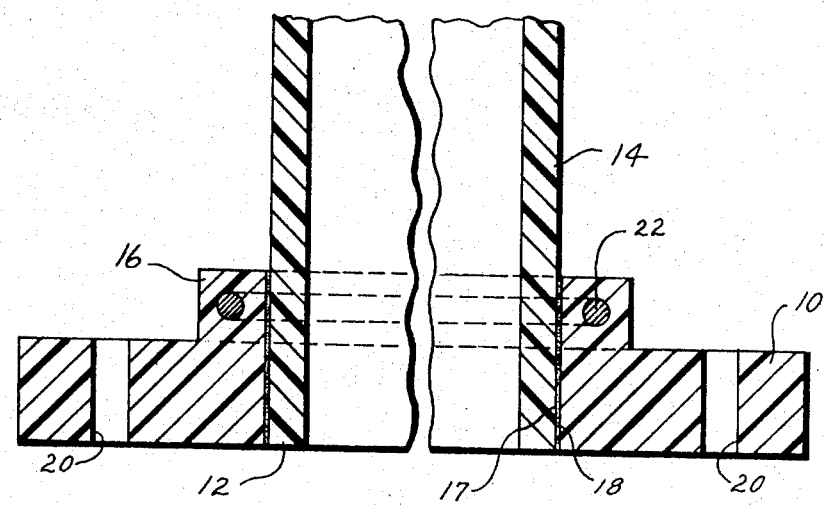
FIG. 1 is a fragmentary sectional elevation view showing a plastic pipe flange and reinforcing ring.

Referring to FIG. 1, a molded plastic flange 10 encircles the exterior end portion 12 of a FRP pipe body 14. Flange 10 preferably has an elongated hub 16. A central bore 17 extends through the flange and hub. Pipe body 14 makes a tight fit in bore 17, and a layer of adhesive 18, preferably epoxy resin with a filler such as sand, bonds the I.D. of the flange to the exterior of the pipe body. Alternately, the I.D. of the flange can be threaded onto the pipe body.

A series of radially spaced apart bolt holes 20 are formed in flange 10. The bolt holes provide means for securing the flange to the flange of an adjoining pipe (not shown).

A reinforcing ring 22 embedded in hub 16 encircles pipe body 14.

Preferably, flange 10 is made of fiber-reinforced plastic. Ideally, reinforcing ring 22 is made of a material having a higher Young's modulus than the plastic pipe body or the plastic flange. Reinforcing ring 22 preferably is an integral steel O-ring, although the ring also can be made of multiple steel wire.

In practice, we have found that the high-strength reinforcing ring extends substantially the internal pressure capability of flanged joints in FRP piping systems. For example, in one test a one-half inch thick integral steel O-ring increased the rupture strength of a FRP flange from 270 psi to 600 psi.

In another test, a flange reinforced with a ring made of pre-impregnated glass roving (continuous strands of glass fibers) improved the ability of the flange to withstand hydrostatic pressure 22 percent, compared with 100 percent for a steel reinforcing ring. Young's modulus for a glass roving ring is about $5 \times 10^6$ psi. A steel reinforcing ring has a Young's modulus of about $28 \times 10^6$. Thus, the improvement in strength is approximately in proportion to the modulus of the material in the ring.

Preferably, the ring material is such that elongation within the elastic range of the ring is equal to or greater than that of the molded plastic part of the flange. Increasing the strength of the ring so that its elastic range exceeds the ability of the molding compound to contain the ring does not improve flange performance. For example, a ring made of low strength steel performs as well as one made of high strength steel.

The reinforcing ring will improve the performance of non-hubbed flanges, but is of greatest value for hubbed flanges, particularly hubbed flanges having an I.D. of 6 inches or more.

Since the reinforcing ring has a higher Young's modulus than both the flange and the pipe body, it restricts the expansion in diameter of both the pipe and the flange. This reduces the strain exerted on the flange, and thereby permits the flange to operate at higher pressures without stress cracks starting at the hub. Such stress cracks would otherwise destroy the entire flange.

We have found that best performance of the reinforced flange is obtained when the reinforcing ring occupies between about 10 percent and about 60 percent the volume of the hub of the flange. A larger reinforcing ring causes stress concentrations in the hub which, in turn, cause the flange to crack during use. A smaller reinforcing ring does not provide sufficient reinforcement to significantly extend the internal pressure capability of the flange.

We have also found that there are limitations on where the reinforcing ring can be embedded in the flange. For example, the ring should not be positioned between the outer edge of bolt holes 20 and the outer edge of the flange. Reinforcing rings placed in this area cause the plastic flange to crack during fabrication.

Figure 2:
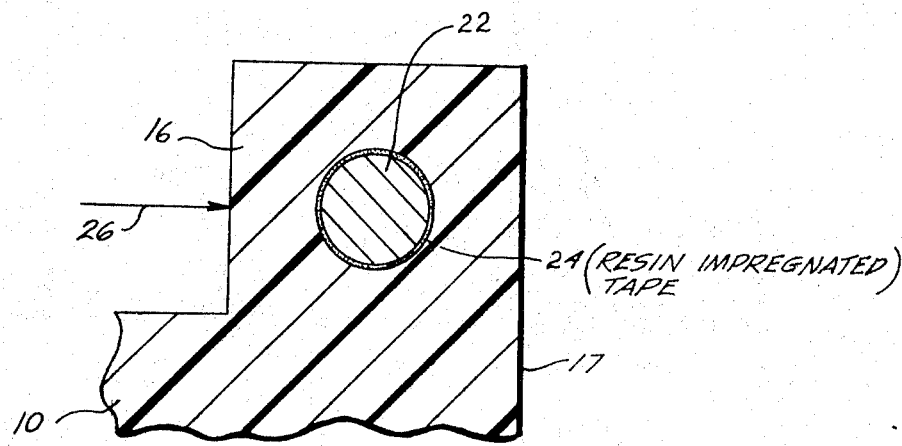
FIG. 2 is a fragmentary sectional elevation view showing an alternate embodiment of the reinforcing ring.

FIG. 2 shows an alternate method of reinforcing the flange. A layer of woven fiberglass tape 24 is impregnated with resin and then wrapped around the steel reinforcing ring. A small portion of the molding compound is placed in the hub part of the mold. The ring is then placed in the mold cavity (not shown) and the remainder of the molding compound is placed in the mold while the resin on the tape is still uncured. The mold is then closed. We have found that an additional 25 percent increase in hydrostatic burst pressure inside pipe body 14 is obtainable with the ring shown in FIG. 2 when compared with a flange reinforced with a steel ring alone.

It is believed that this increased performance is obtained because the resin-impregnated tape can withstand shrinkage stresses and other stresses caused by bolting and hydrostatic pressure present in the plastic molding compound around the reinforcing ring. The wrap is stronger and stiffer than the molding compound in the rest of the flange, but it is not as stiff as the steel. Therefore, it provides a good transition between materials of very different properties. The effect of the resin-impregnated tape is to evenly distribute shrinkage stresses and other stresses around the reinforcing ring and thereby provide a better transfer of stress from the load through the plastic to the reinforcing ring. Since the ring has a higher Young's modulus than the surrounding plastic, it tends to stretch less under loading and therefore improves the performance of the flange.

When the reinforcing ring is not wrapped with the glass fabric tape, the flange will tend to break in the area indicated by arrow 26 in FIG. 2 when the pipe is subjected to relatively high internal pressures. When the whole ring is wrapped, strength in the area indicated by arrow 26 is increased.

Glass fabric tape is the preferred reinforcement for this application. However, metal, carbon, or other ceramic fibers can be applied to the ring to reinforce the plastic.

We claim:

1. The combination comprising an elongated plastic pipe body of the type used in conducting fluids under pressure, a plastic flange connected to an exterior portion of the pipe body adjacent an end of the pipe, the plastic flange being comprised of flange and hub sections encircling the pipe body, the hub section being formed in a single piece with the flange section; the hub section being spaced longitudinally of the pipe body from the flange section, and being of substantially reduced diameter relative to the diameter of the flange section, the plastic flange being connected to the pipe body with the flange section adjacent the end of the pipe body and the hub section remote from the end of the pipe body, and a closed curve reinforcing O-ring having a layer of resin impregnated tape bonded thereto, said O-ring being embedded in the hub section with a major portion of the reinforcing ring encircling the pipe body at a location spaced longitudinally from the flange section, the reinforcing ring having a greater Young's modulus than that of flange or the pipe body to improve the rupture strength of the flange.

2. The combination according to claim 1 in which the reinforcing ring occupies between about 10 percent and about 60 percent of the volume of the hub section.

3. The combination according to claim 2 in which the flange and pipe body are made of molded fiber-reinforced plastic.

4. The combination according to claim 2 in which the inside diameter of the flange is at least about 6 inches.

5. The combination according to claim 1 in which the flange and pipe body are made of molded fiber-reinforced plastic.

6. The combination according to claim 1 in which the tape comprises resin-impregnated woven fiberglass fabric tape.

7. The combination according to claim 1 in which the tape is made of a fabric which can reduce stresses in the flange and provide greater rupture strength for the flange than a flange reinforced with a reinforcing ring not wrapped with a layer of such tape.

8. The combination according to claim 1 in which the layer of tape has a stiffness greater than that of the plastic in the flange, but less than that of reinforcing ring.

9. The combination comprising a plastic pipe body, a plastic flange connected to an exterior portion of the pipe body adjacent an end of the pipe, the plastic flange being comprised of flange and hub sections encircling the pipe body, the hub section being formed of a single piece with the flange section; the hub section being spaced longitudinally of the pipe body from the flange section with the hub section being of substantially reduced diameter relative to the diameter of the flange section, the plastic flange being connected to the pipe body, with the flange section adjacent the end of the pipe body and the hub section being remote from the end of the pipe body, and a closed curve reinforcing O-ring embedded in the flange section with the ring encircling the pipe body, the reinforcing ring having a greater Young's modulus than that of the flange or pipe body so as to improve the rupture strength of the flange, the reinforcing O-ring being wrapped with a layer of resin impregnated tape bonded to the ring and capable of improving the stress resistance of the plastic in the vicinity of the ring.

10. The combination according to claim 9 in which the tape comprises resin-impregnated woven fiberglass fabric tape.

11. The combination according to claim 9 in which the tape is made of a fabric which can reduce stresses in the flange and provide greater rupture strength for the flange than a flange reinforced with a reinforcing ring not wrapped with a layer of such tape.

12. The combination according to claim 9 in which the layer of tape has a greater stiffness than that of the plastic in the flange, but less than that of the reinforcing ring.

* * * * *